United States Patent
Higgs (10) Patent No.: US 6,959,491 B2
(45) Date of Patent: Nov. 1, 2005

(54) STRAIN CONTROL DEVICE FOR ATTACHING TRANSMISSION LINES TO DEFORMABLE STRUCTURES AND METHODS EMPLOYING SAME

(75) Inventor: Thomas W. Higgs, Kaysville, UT (US)

(73) Assignee: Alliant Techsystems Inc., Edina, MN (US)

( * ) Notice: Subject to any disclaimer, the term of this patent is extended or adjusted under 35 U.S.C. 154(b) by 0 days.

(21) Appl. No.: 10/871,149

(22) Filed: Jun. 18, 2004

(65) Prior Publication Data

US 2005/0097738 A1 May 12, 2005

Related U.S. Application Data

(62) Division of application No. 10/056,943, filed on Oct. 25, 2001, now Pat. No. 6,770,821.

(51) Int. Cl.$^7$ .......................... H02G 3/04; H05K 13/00
(52) U.S. Cl. ............................ 29/854; 29/868; 174/97; 174/98; 174/135
(58) Field of Search ........................... 174/72 A, 72 C, 174/73.1, 96–98, 135; 29/453, 854, 868, 29/869, 887; 385/100, 134, 135, 136

(56) References Cited

U.S. PATENT DOCUMENTS

| | | | |
|---|---|---|---|
| 3,391,432 A | 7/1968 | Du Rocher | |
| 3,895,362 A * | 7/1975 | Yamakawa et al. | ............ 365/57 |
| 4,023,879 A | 5/1977 | Braund et al. | |
| 4,162,561 A * | 7/1979 | Tillemans | .................. 24/129 R |
| 4,567,318 A | 1/1986 | Shu | |
| 4,723,053 A | 2/1988 | Amaya | |
| 4,845,316 A | 7/1989 | Kaercher | |
| 4,911,510 A | 3/1990 | Jenkins | |
| 4,917,622 A | 4/1990 | Davis | |
| 5,041,002 A | 8/1991 | Byrne | |
| 5,095,822 A | 3/1992 | Martin | |
| 5,115,260 A | 5/1992 | Hayward et al. | |

(Continued)

FOREIGN PATENT DOCUMENTS

| | | |
|---|---|---|
| FR | 915 771 A | 11/1946 |
| FR | 1 406 147 A | 7/1965 |

OTHER PUBLICATIONS

Lewis, Richard J., Sr., "Hawley's Condensed Chemical Dictionary," 1997 John Wiley & Sons, Inc., Thirteenth Edition; pp. 498, 753, 782, 792, 961, 995.

French Search Report dated Dec. 1, 2004.

*Primary Examiner*—Dean A. Reichard
*Assistant Examiner*—Adolfo Nino
(74) *Attorney, Agent, or Firm*—TraskBritt (57) ABSTRACT

A device and method for controlling strain in a transmission line such as a power or signal transmitting wire, cable or other conduit. The device includes a body having at least one cavity formed therein for receipt of at least a portion of a transmission line. Multiple openings formed in the body allow the transmission line to extend from the at least one cavity and external to the body. The at least one cavity is defined to include a peripheral boundary formed at least partially by a first substantially linear wall and a second opposing wall which deviates from the first wall, thereby forming a deviation path for the transmission line disposed therein. A cover may be provided to cooperatively mate with the body such that it conceals the cavity or cavities formed therein.

20 Claims, 8 Drawing Sheets

U.S. PATENT DOCUMENTS

| | | |
|---|---|---|
| 5,158,476 A | 10/1992 | Kirby |
| 5,414,218 A | 5/1995 | Nathan |
| 5,478,254 A | 12/1995 | Holt |
| 5,703,330 A | 12/1997 | Kujawski |
| 5,800,500 A * | 9/1998 | Spelman et al. ............ 607/137 |
| 6,049,040 A | 4/2000 | Biles et al. |
| 6,184,474 B1 | 2/2001 | Craft, Jr. |
| 6,268,566 B1 | 7/2001 | Takiguchi et al. |

* cited by examiner

STRAIN CONTROL DEVICE FOR ATTACHING TRANSMISSION LINES TO DEFORMABLE STRUCTURES AND METHODS EMPLOYING SAME

CROSS-REFERENCE TO RELATED APPLICATION

This application is a divisional of application Ser. No. 10/056,943, filed Oct. 25, 2001, now U.S. Pat. No. 6,770,821, issued Aug. 3, 2004.

BACKGROUND OF THE INVENTION

1. Field of the Invention

The present invention relates generally to the attachment of wires, cables or other conduits to flexible structures, or between multiple structures expected to exhibit relative motion therebetween, and, more particularly, to the employment of such wires, cables or conduits in high strain-inducing environments while protecting the wires, cables or conduits from such strain and while also providing protection from dynamic or other natural and induced environments.

2. State of the Art

Wires, cables and other conduits, referred to collectively herein as transmission lines, are conventionally used to transmit power or signals in various applications. Such transmission lines may transmit power or signals, for example, electrically, hydraulically or pneumatically. Often such transmission lines are attached to an associated structure for which the transmission lines are carrying power or are communicating signals. For example, transmission lines are conventionally found in, and are in some manner attached to, buildings, cars, transport vehicles, railway cars, aerospace vehicles and numerous other structures to deliver power to, or communicate with, various components of such structures.

In numerous applications, the structure to which the transmission lines are attached may experience forces or motions which place a strain on the transmission lines. Alternatively, the transmission lines may be coupled between multiple structures, or between multiple components of a single structure, wherein the relative movement between the multiple structures may induce strain therein.

For example, transmission lines are conventionally attached to a rocket motor's casing for powering and controlling components associated with the rocket motor. A conventional rocket motor may include a casing fabricated from a composite material formed of fibers or filaments and a bonding agent and which is configured to accommodate a relatively large amount of strain during operation of the rocket motor. For example, operational stresses applied to the casing of a conventional rocket motor may result in a strain exhibited as an elongation of the casing of up to 2%. Additionally, pressure from within the rocket motor may cause a radial deformation of the casing. Transmission lines conventionally attached to such a casing may experience mechanical degradation and potential failure when exposed to high-strain magnitudes.

In an effort to reduce the strain experienced by transmission lines in such service, various techniques and systems have been employed. However, such conventional techniques and systems are expensive and require an extensive amount of time and labor to install. For example, a given rocket motor may require upwards of 2,500 individual parts, including various brackets, clamps and covers, to install the requisite raceways which house transmission lines associated with the rocket motor. Additionally, installation of such a raceway system may require several weeks of intensive labor.

Figure 1:
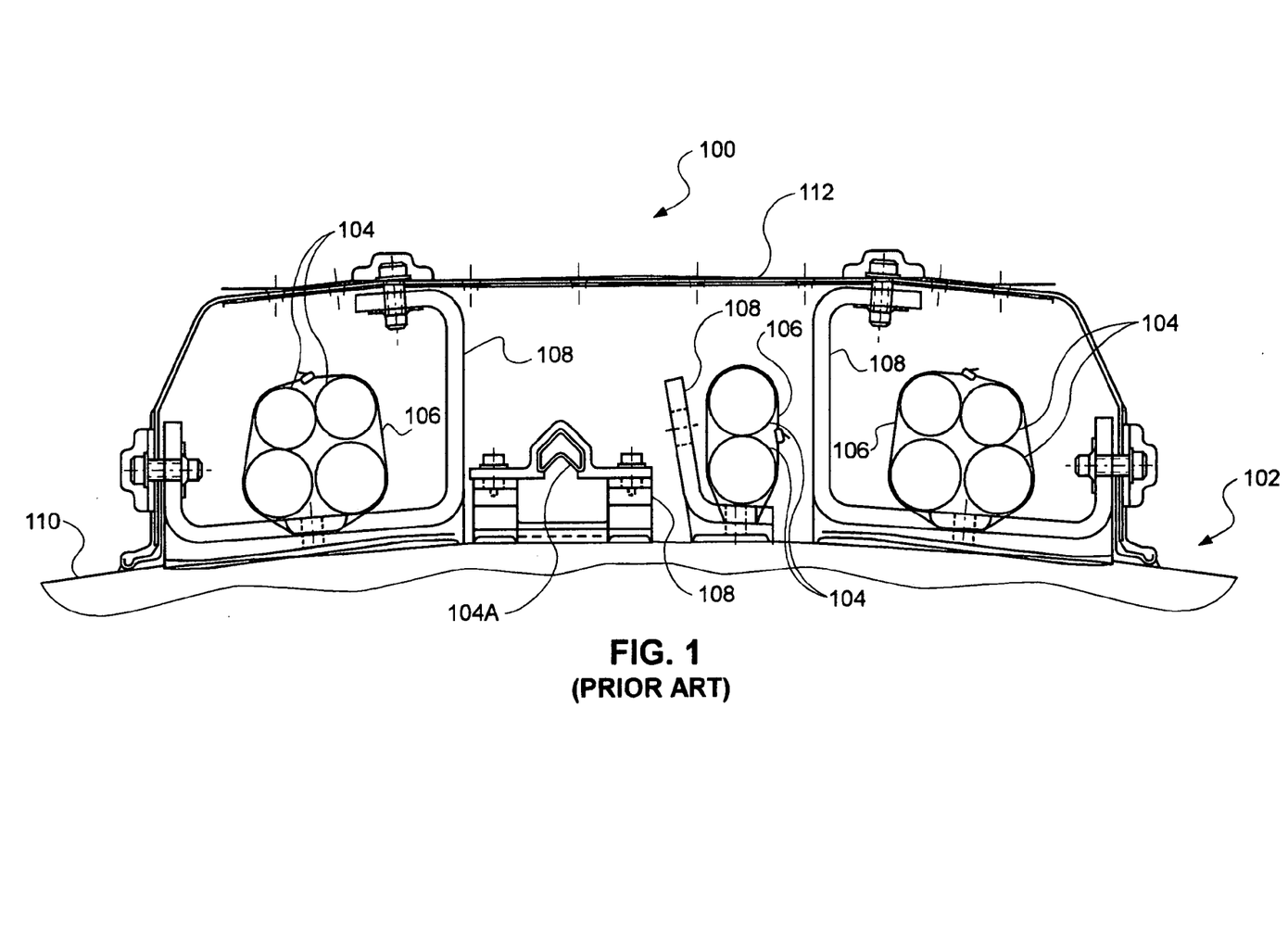
FIG. 1 is a cross-sectional view of a prior art raceway used to house transmission lines associated with a rocket motor.

Referring to FIG. 1, a cross-section of such a prior art raceway 100, coupled to a rocket motor 102, is shown. The raceway 100 is configured to house multiple transmission lines 104, which transmission lines may include various configurations and sizes of wires, cables and conduits. The transmission lines 104 may even include destruct charges 104A which are configured to destroy the rocket motor 102 in the case of an errant rocket path, as will be appreciated by those of ordinary skill in the art.

Clamping mechanisms 106 may be employed to bundle multiple transmission lines 104 together. The transmission lines 104 and/or the clamping mechanisms 106 may be coupled to various brackets 108, which may in turn be attached to the casing 110 of the rocket motor 102 by means of fasteners or through use of an adhesive. Covers 112 of various configurations serve to conceal and protect the transmission lines 104 from an external atmosphere and provide a more aerodynamic profile on the rocket motor exterior.

Numerous design requirements must be met in implementing the raceway 100 with the rocket motor 102. For example, each bracket 108 may need to be individually tested upon assembly. Any adhesive or shear ply used in the installation of the raceway 100 must be able to withstand local elongation transferred from the rocket motor 102. Further, the raceway covers 112 must be designed to slide relative to other components during operation of the rocket motor 102 so as to prevent mechanical damage to themselves or other components of the raceway 100. For example, slots may be formed in the covers 112, allowing fasteners to be placed therethrough, thereby maintaining the cover in a substantially fixed radial position relative to the rocket motor 102, but allowing the covers 112 a limited amount of longitudinal movement relative to the rocket motor 102, the brackets 108 and other components attached thereto.

Additionally, the raceway 100 must meet pressure and thermal design criteria. For example, the raceway 100 must be able to withstand both internal and external pressures which may result in a differential pressure of up to 10 pounds per square inch, or higher. In order to prevent thermal degradation, all covers may include a cork thermal protection which is conventionally manually applied. Further, a room temperature vulcanizing (RTV) sealant is conventionally applied along all edges during assembly. Also, air flow and temperature within the raceway 100 must be considered as it is often desirable to limit the exposure of the transmission lines 104 to hot air or other gases which may be present within the raceway 100.

Thus, as can be seen, a great deal of design, preparation, manufacture and assembly work goes into installing transmission lines on a rocket motor to ensure proper operation.

As mentioned above, installation of transmission lines on or between other structures may experience similar difficulties. For example, relative movement between a truck and a trailer (or between two railway cars) may induce unwanted strain in transmission lines coupled therebetween. Additionally, pressurized pipelines, rotating or moving aircraft surfaces and earthquake-proof buildings, to name a few examples, may induce unwanted strains in transmission lines associated therewith and extending between mutually movable components, or components which elongate in various directions under applied stresses.

In view of the shortcomings in the art, it would be advantageous to provide a device and a method for attaching transmission lines to or between structures and which allow the structure to experience relatively high strains, including strains induced by stretching, compression, or other flexure, while maintaining the associated transmission lines in a low-strain environment. Such a device and method might also desirably provide thermal and environmental protection to the transmission lines.

It would be additionally advantageous to provide a device and a method for controlling the strain experienced by transmission lines which is simple and relatively inexpensive to fabricate and install and/or implement. It would also be advantageous to provide such a device and a method which is easily tailored to specific applications and installations.

BRIEF SUMMARY OF THE INVENTION

In accordance with one aspect of the invention, a strain control device is provided. The strain control device includes a body having a first end and a second end. A first opening is defined in the first end and a second opening is defined in the second end. At least one cavity is formed in the surface of the body such that the at least one cavity is in communication with the first and second ends. A periphery of the at least one cavity is defined, at least partially, to include a first substantially linear wall and a second opposing wall which deviates from the first substantially linear wall. The second opposing wall may include a curved configuration with at least a portion exhibiting a constant radius.

In accordance with another aspect of the invention, another strain control device is provided. The strain control device includes a body having a first end and a second end. A first plurality of openings is defined in the first end and a second plurality of openings is defined in the second end. A plurality of cavities is formed in a surface of the body, with each cavity of the plurality being in communication with an opening of the first plurality of openings and an opening of the second plurality of openings. Each of the plurality of cavities also includes a periphery which is at least partially defined by a first substantially linear wall and a second opposing wall which deviates from the first substantially linear wall.

In accordance with another aspect of the invention, another strain control device is provided. The strain control device includes a body having a first end and a second end. At least one cavity is formed in the body between the first end and the second end. The at least one cavity is configured to receive at least a portion of a transmission line therein and defines a deviation path for that portion of the transmission line.

In accordance with another aspect of the invention, a rocket motor is provided. The rocket motor includes a rocket casing and a body attached to a surface of the rocket casing. The body includes a first end and a second end with a first opening being defined in the first end and a second opening defined in the second end. At least one cavity is formed in a surface of the body, with the at least one cavity being in communication with the first and second openings. A peripheral boundary of the at least one cavity is at least partially defined by a first substantially linear wall and a second opposing wall which deviates from the first substantially linear wall.

In accordance with another aspect of the invention, another strain control device is provided. The strain control device includes a body having a first grasping member configured to frictionally engage a first portion of a transmission line and a second grasping member configured to frictionally engage a second portion of the transmission line. At least one cavity is defined in the body between the first grasping member and the second grasping member, wherein the at least one cavity is configured to accommodate a third portion of the transmission line therein and defines a deviation path for the third portion of the transmission line.

In accordance with another aspect of the present invention, a method of controlling strain in a transmission line is provided. The method includes providing a body, forming a first opening in a first end of the body, forming a second opening in a second end of the body, and forming a cavity in a surface of the body between and in communication with the first and second openings. The cavity is defined by a peripheral boundary which includes a first substantially linear wall and a second opposing wall which deviates from the first substantially linear wall. The method further includes positioning a transmission line within the cavity such that it extends from the first opening, through the cavity and through the second opening.

In accordance with another aspect of the present invention, another method of controlling strain in a transmission line is provided. The method includes providing a body having a first grasping member and a second grasping member and forming a cavity in the body in communication with the first and second grasping members, wherein the cavity is configured to provide a deviation path to the transmission line. A first portion of the transmission line is frictionally engaged with the first grasping member, a second portion of the transmission line is frictionally engaged with the second grasping member, and a third portion of the transmission line is disposed within the cavity.

In accordance with another aspect of the present invention, a method of forming a strain control device is provided. The method includes providing a body, forming a first opening in a first end of the body, forming a second opening in a second end of the body, and forming at least one cavity in a surface of the body in communication with the first and second openings.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 2:
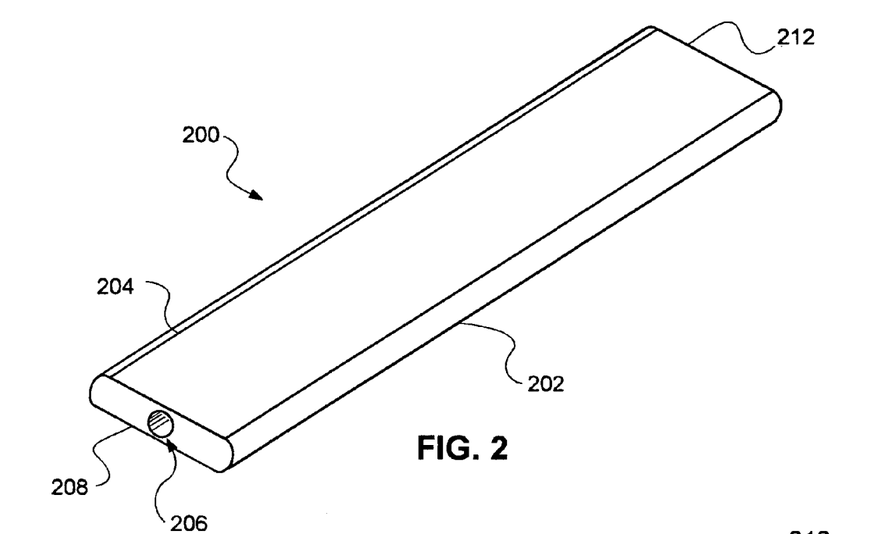
FIG. 2 is a perspective view of one embodiment of a strain control device according to the present invention.

Referring to FIG. 2, a strain control device 200 is shown, which may include a body 202 and a cover 204 cooperatively mated with the body 202. An opening 206 or a port is formed through the end 208 of the body 202. A similar opening 210 (FIG. 3) is formed through the opposite end 212 of the body 202.

Figure 3:
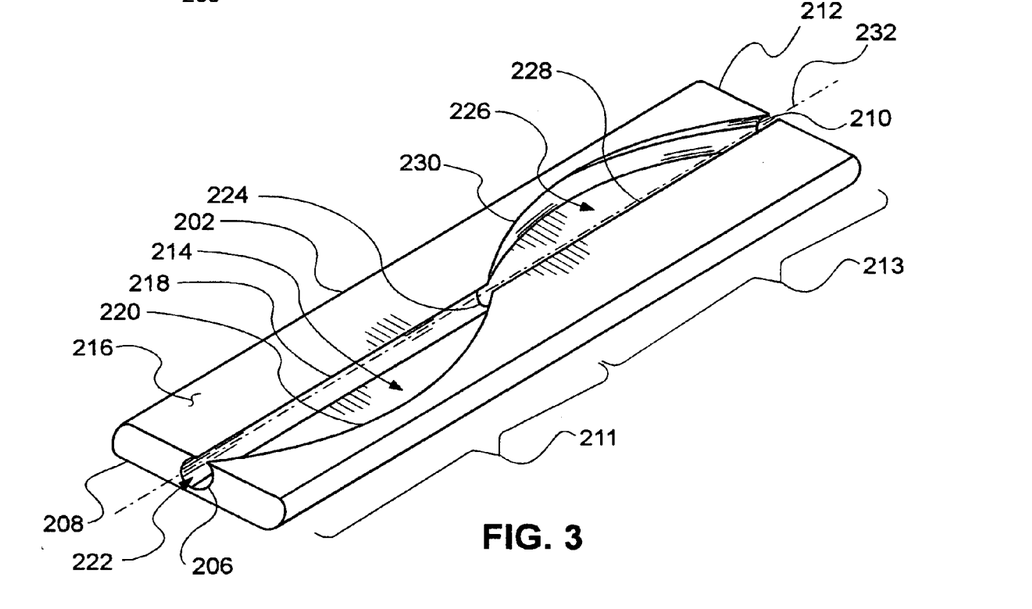
FIG. 3 is a perspective view of the device shown in FIG. 2 with its associated cover removed.

Referring to FIG. 3, the body 202 is shown with the cover 204 removed therefrom. The body 202 may be described as including a first body section 211 and a second body section 213. The first body section 211 includes a first cavity 214 formed in the upper surface 216 of the body 202. The first cavity 214 is defined by a substantially linear wall 218 and an opposing curved wall 220 which laterally deviates from the substantially linear wall 218. At one end of the first cavity 214, the substantially linear wall 218 and the opposing curved wall 220 adjoin the opening 206, thereby causing the first cavity 214 to be exposed through the end 208 of the body 202.

It is noted that, with the cover 204 removed from the body 202, the opening 206 might be described as being substantially "C-shaped," having a mouth 222 formed in the upper surface 216 of the body 202. The opening 210 at the opposing end 212 is similarly configured. The mouths 222 of the openings 206 and 210 allow a transmission line to be inserted therethrough from the top (as shown) of body 202 for installation of the transmission line into the strain control device 200 as shall become more apparent below. While a transmission line might be longitudinally threaded through an opening or port 206 or 210 which does not include a mouth 222 (i.e., an aperture having a continual ring-like configuration), an opening configured to include a mouth 222 is desirable for assembly purposes, particularly in helping to reduce the time of installing a transmission line, as the transmission line may be effectually "snapped" into place in body 202 rather than threaded therethrough. The cover 204 (FIG. 2) may then be coupled with the body 202 so as to conceal the cavities 214 and 226, and any transmission line installed therein, from an external environment.

The second body section 213 includes a second cavity 226 which is configured similarly to the first cavity 214 and includes a substantially linear wall 228 and a curved opposing wall 230. Toward the center of the body 202, another C-shaped opening 224 serves as a transition aperture from the first cavity 214 to the second cavity 226. In the embodiment shown, the second cavity 226 is configured as a reversed image of the first cavity 214 with respect to a longitudinal centerline 232 that runs through the openings 206 and 210. Thus, the two cavities 214 and 226 adjoined together at the center opening 224 define a general shape which appears somewhat sinusoidal in nature. Particularly, the two curved walls 220 and 230 serve to define a substantially sinusoidal curve opening onto the upper surface 216 of the body 202.

Figure 4:
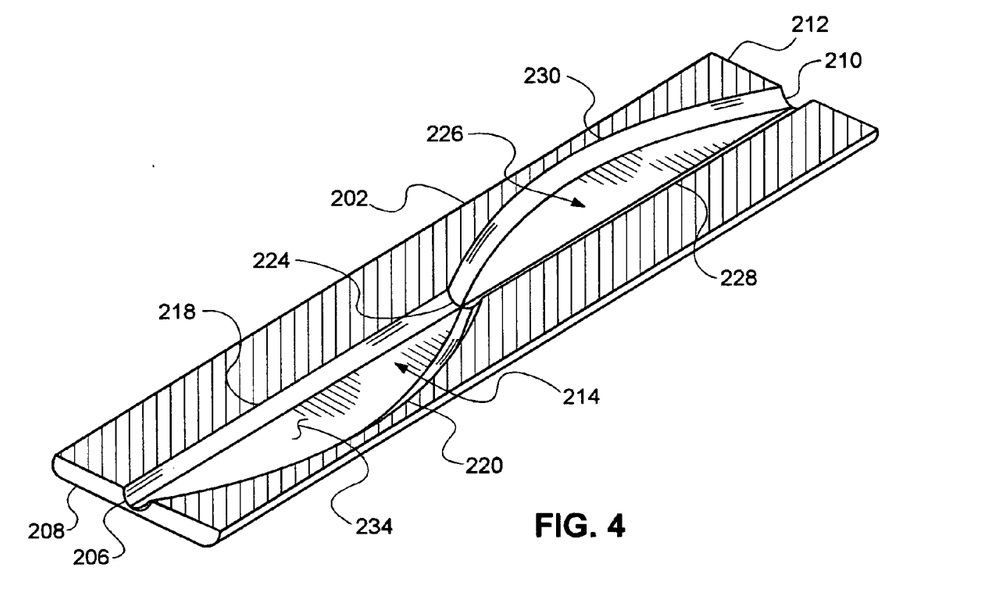
FIG. 4 shows a cross-section of the device shown in FIGS. 2 and 3.

Referring briefly to FIG. 4, a longitudinal cross-sectional view of the body 202, taken parallel to the plane of the body, is shown. The various walls 218, 220, 228 and 230 can be seen to exhibit an arcuate or curved surface as they extend upwardly from the base 234 of the adjoining cavities 214 and 226. The upwardly curved configuration of the walls 218, 220, 228 and 230 allows the walls to more naturally transition into the openings 206, 210 and 224. Additionally, while the walls 218, 220, 228 and 230 might be formed to exhibit an angular transition from the base 234 of the cavities 214 and 226, a curved transition may serve to reduce degradation of the material of the body 202 proximate the transition between the base 234 and the walls 218, 220, 228 and 230 due to repeated strain or elongation of the strain control device 200.

The cavities 214 and 226, as thus configured, provide a deviation path for a transmission line installed therein. The concept of a deviation path might be better understood with reference to FIG. 5, which depicts a graphic 238 similar in configuration to the shape defined by the walls 218, 220, 228 and 230 of the cavities 214 and 226. A nominal transmission line path 240 represents where a transmission line might be located upon installation of the transmission line and when no strain is induced into the strain control device 200. The nominal transmission line path 240, as shown, is slightly curved such that a shallow, substantially sinusoidal-type curve is formed. A linear boundary 242 and a curved boundary 244 determine the extent of allowable deviation from the nominal transmission line path 240. Thus, when the strain control device 200, and more particularly the body 202, experiences an elongating or contracting strain, a transmission line installed therein may deviate from the nominal transmission line path 240 to a new path located between the two boundaries 242 and 244 without experiencing the strain exhibited by the body 202. While the nominal transmission line path 240 is shown to be oriented substantially midway between the straight line 242 and the curved 244 boundaries, it may be placed closer to either boundary 242 or 244, depending on the expected strains that will be seen by the strain control device 200 during operation.

Figure 5:
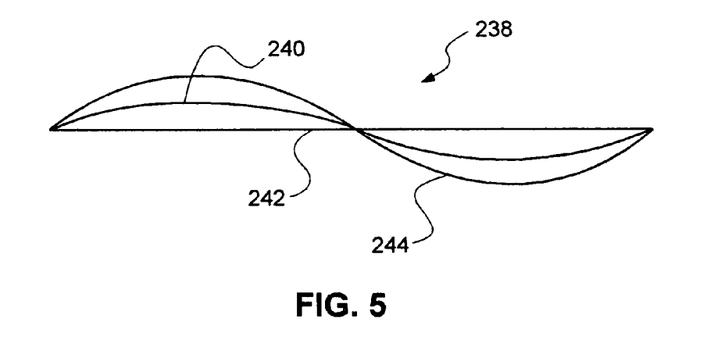
FIG. 5 is a graphic depicting the potential deviation path of a transmission line installed in the device shown in FIGS. 2 and 3.
Figure 6A:
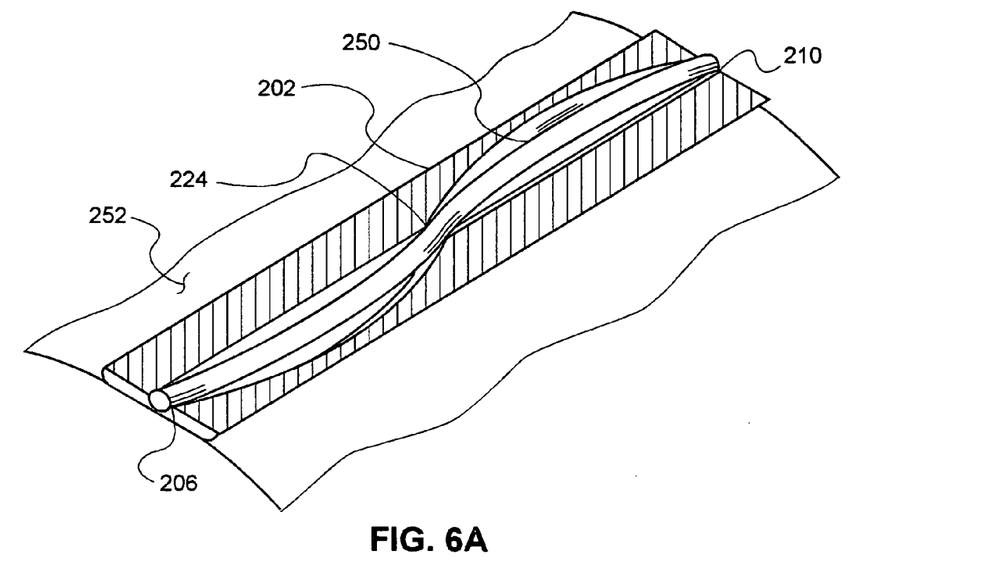
FIGS. 6A and 6B show a cross-sectional view of the device shown in FIG. 3 with a transmission line installed therein.
Figure 6B:
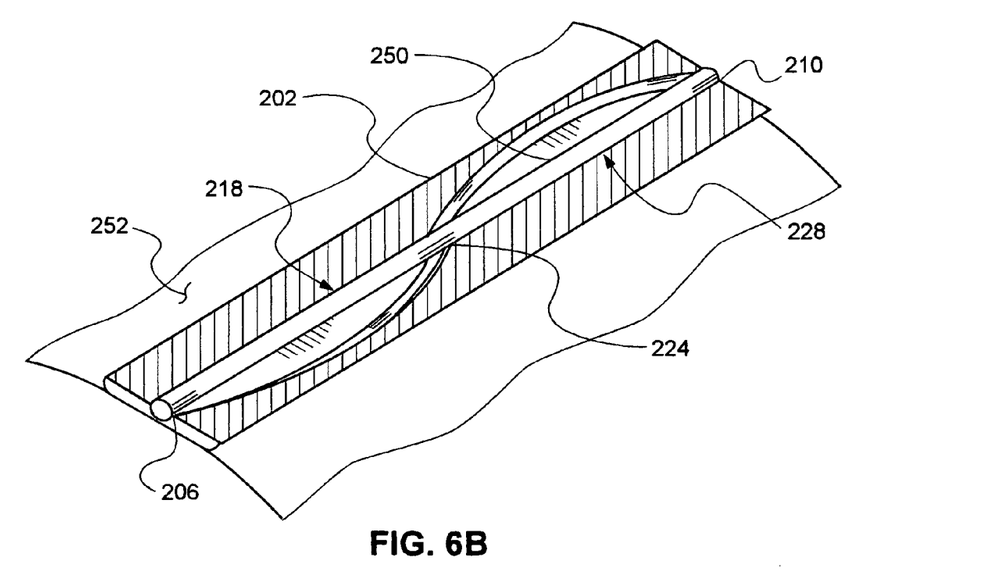

Referring to FIGS. 6A and 6B, a transmission line 250 is shown as installed in the body 202, illustrating the concept of the deviation path shown in FIG. 5. In FIG. 6A, the transmission line 250 is installed in its nominal transmission line path 240 (FIG. 5). As described above, the transmission line 250 may be installed by inserting the transmission line 250 through the mouth 222 (FIG. 3) of the various C-shaped openings 206, 210 and 224. The C-shaped openings 206, 210 and 224 are sized and configured to snugly grasp the transmission line 250 and hold it in place once it has been installed. In operation, the C-shaped openings might be considered constriction points, as will become more evident below.

The body 202, as shown, is attached to a structure such as, for example, a composite rocket motor casing 252, although other structures are contemplated. The body 202 may be attached by adhesive, through the use of fasteners or through other techniques as understood by those of skill in the art.

During operation of a rocket motor, the casing 252 is subject to numerous forces, including internal and external pressure environments, which induce strain in the casing 252. The induced strain may result in elongation, contraction or other flexure of the casing 252. The body 202 is designed to withstand strains similar to that seen in the rocket motor casing 252. To accommodate such strain, the body 202 may be formed of an elastomeric material such as neoprene rubber, although other materials are contemplated. Additionally, forming the body of such a flexible conformable material may allow the body 202 to be installed on structures of various configurations, for example, by cooperatively mating with the radial surface of the rocket motor casing 252.

Referring to FIG. 6B, when the rocket motor casing 252 is strained, for example, in an elongating fashion, the body 202 is formulated, configured and attached to the rocket motor casing 252 to correspondingly elongate therewith. During elongation of the body 202, the openings 206, 210 and 224 substantially maintain their grasp on the transmission line 250 and cause the transmission line 250 to deviate from its nominal transmission line path 240 (FIG. 5) and straighten such that it follows a path along the substantially linear walls 218 and 228; in other words, it approaches and/or reaches the linear boundary 242 (FIG. 5) of its deviation path.

A similar reaction occurs when a longitudinally contracting strain is induced into the body 202. However, upon contraction of the body 202, the transmission line 250 would become displaced, or deviate, from its nominal transmission line path 240 (FIG. 5) toward the curved walls 220 and 230, or toward the curved boundary 244 (FIG. 5) of its deviation path.

Thus, the body 202 is formulated and configured to absorb the strain induced by the structure to which it is attached (or induced by the relative movement of multiple structures between which it is attached) while substantially isolating the strain from the transmission line 250. The body 202 may be designed such that it isolates the transmission line 250 from all of the expected strain produced by a given structure, or it may be designed such that a limited amount of strain may be ultimately transferred to the transmission line 250.

Figure 7:
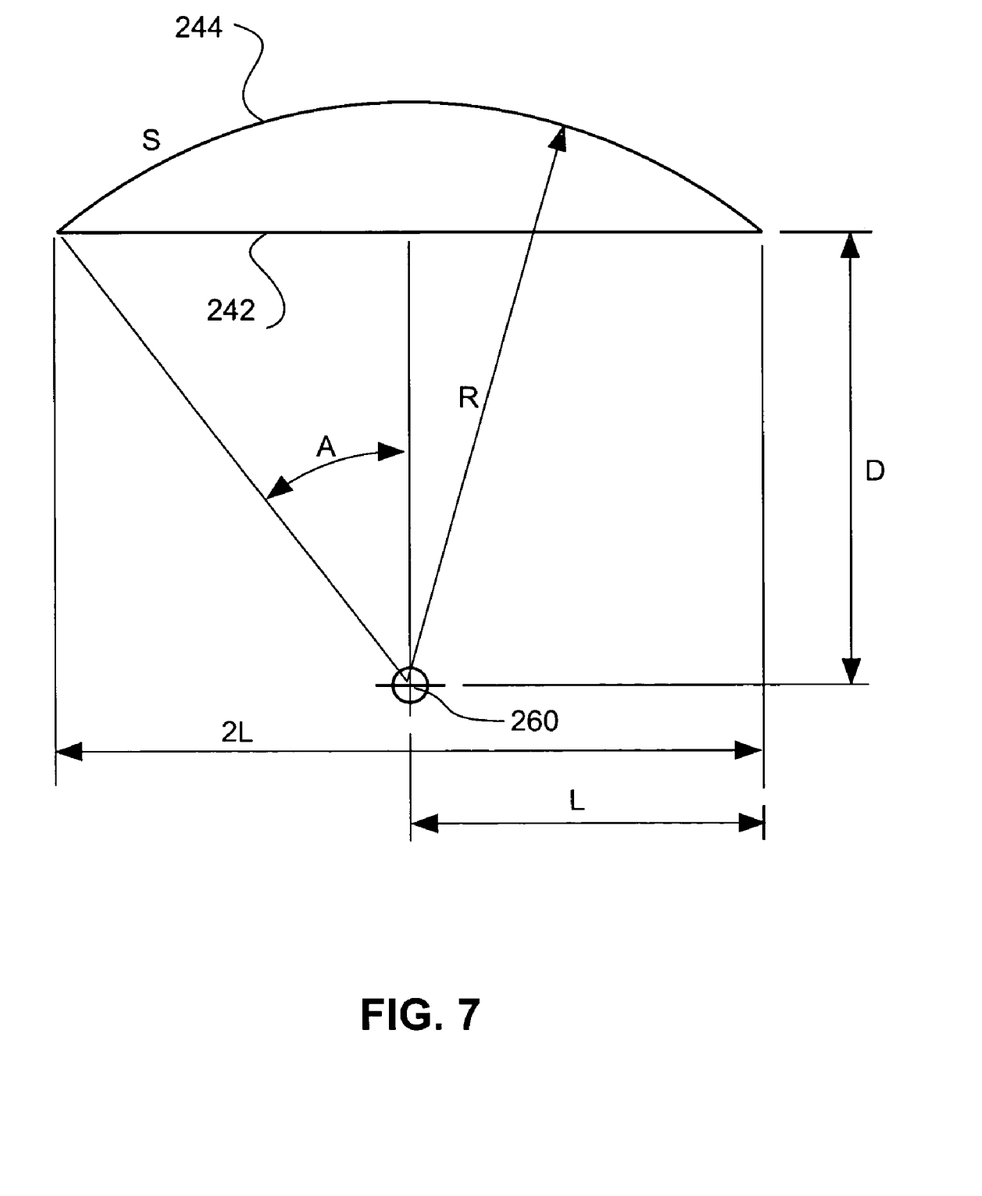
FIG. 7 is a graph of a potential transmission line path indicating various parameters associated with determining a maximum path deviation according to one aspect of the present invention.

Referring now to FIG. 7, the design and configuration of the maximum geometric deviation path length for a curved boundary 244 exhibiting a constant radius is described. The curved boundary 244 is defined as being an arc extending through an angle of 2A (in radians), having a radius of R and an arc length of S. The corresponding linear boundary 242 may be defined to have a length 2L. The distance between the linear boundary 242 and the center 260 of the curved boundary 244 is defined as D. The equations used to determine the maximum deviation path length for such a configuration are as follows:

EQ. 1:
$$A = \cos^{-1}\left(\frac{D}{R}\right)$$

EQ. 2:
$$S = 2RA \text{ and}$$

EQ. 3:
$$\text{Elongation(strain)} = \frac{S - 2L}{2L}$$

Thus, starting with an anticipated value of maximum elongation (either calculated or measured) and an initial length (2L) of the linear boundary 242, one can solve for the arc length (S) of the curved boundary 244 using EQ. 3. Selecting a desired radius (R) and having solved for the arc length (S), EQ. 2 may be solved for the half angle (A) of the curved boundary 244, which may in turn be used to solve for the distance (D) between the center 260 of the curved boundary 244 and the linear boundary 242 using EQ. 1.

For example, in designing the deviation path for a first cavity 214 in the body 202 shown in FIG. 3, one may start with an initial strain of approximately 2.5% (or 0.025 inches per inch). With a linear boundary 242 length 2L of 12 inches and a desired radius of approximately 16 inches, the above equations can be solved to determine that the arc length S of the curved boundary 244 is approximately 12.3 inches, which traverses through an angle 2A of approximately 0.76875 radians (or approximately 44°).

Figure 8:
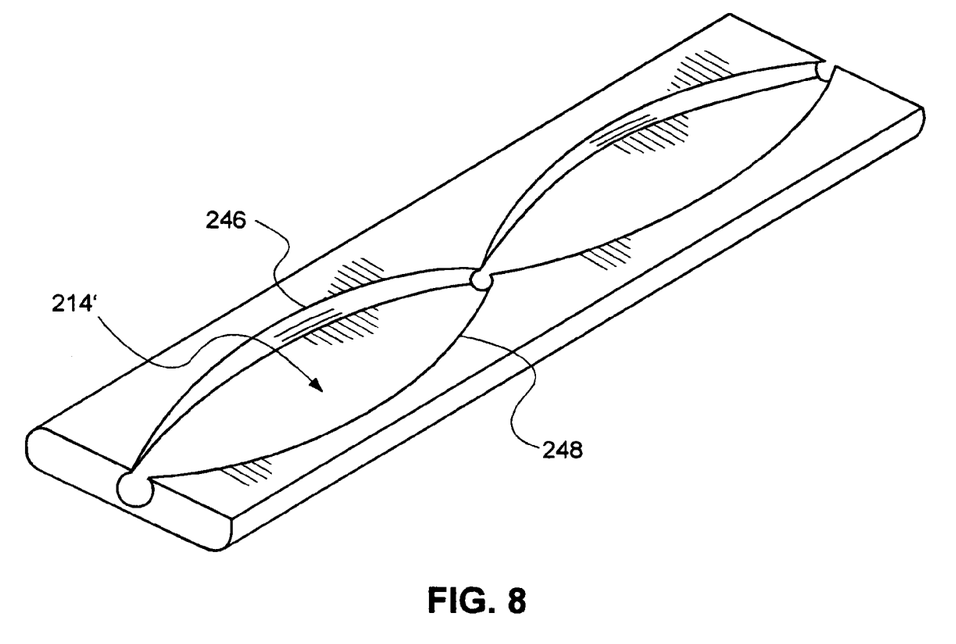
FIG. 8 is a perspective view of another embodiment of the present invention.

It is noted that while the above exemplary equations are for a deviation path having a curved boundary 244 of a constant radius, other nonlinear boundary configurations may be utilized. For example, a zigzag pattern, ellipses, parabolas, hyperbolas or any path that deviates from the linear boundary 242 may be utilized. Additionally, the cavity and the deviation path defined thereby need not include a substantially linear wall. For example, with reference to FIG. 8, a cavity 214' may be formed having a first nonlinear wall 246 and a second opposing nonlinear wall 248 if so desired. Additionally, while most of the cavities have been defined having walls which define a generally two-dimensional deviation path, a three-dimensional deviation path may be defined within the cavity if so desired.

Additionally, while certain examples have been set forth above, the strain control device 200 may be formed of various materials using various methods of construction. For example, as mentioned above, the body 202 may be formed of a neoprene rubber. However, numerous materials having various densities and mechanical properties may be used depending on the conditions of service the strain control device 200 is expected to experience. Thus, the body 202 may be formed of a low-density foam, a high-density rubber, or any of a number of materials of varying density in between. Another exemplary material may include a polyurethane which is amenable to forming dual-density molds.

The body 202 may include Microballoons®, or other hollow, finely divided, hole-free, low-density particles of synthetic resins to vary the density as desired, fiber reinforcement, such as glass or carbon fibers, to tailor the mechanical properties, or the addition of various filler materials such as, for example, silica for thermal resistance. With such flexibility in composition, the strain control device 200 may be customized and tailored for various environments and conditions. For example, it may be desirable to limit the amount of strain or elongation exhibited by the body 202 during operation. Thus, the inclusion of fiber reinforcing members in the body may allow the amount of elongation exhibited by the body 202 to be limited to a predetermined amount, thereby preventing potential damage to the body 202 and/or any transmission lines disposed therein.

Further, the body 202 may even be formed of a material which varies in density and/or composition from one portion of the body 202 to another, thereby allowing a very high degree of customization.

The ability to form the body 202 from numerous materials also allows for flexibility in manufacturing. Desirably, the body is formed from a molding process or from an extrusion process which allows for simple and cost effective manufacturing relative to prior art systems such as was described with respect to FIG. 1 above. Additionally, while shown as being generally flat or planar, the body 202 may be formed to a predetermined shape, such as a desired radius, for easier and more effective installation on a given structure. Alternatively, one or more surfaces may be so configured. For example, the undersurface of the body 202 may be defined as a shallow, concave curve of substantially the same radius as and exterior of a rocket motor casing 252.

Likewise, the cover 204 may be formed of various materials and through various fabrication processes. In certain applications, it may be desirable to form the body 202 and the cover 204 from different materials. For example, when using the strain control device 200 in conjunction with a rocket motor, it may be desirable to form the body 202 from a material such as silica-filled nitrile rubber (NBR), which accommodates relatively high levels of strain while also providing some thermal protection. However, it may be desirable in such circumstances to form the cover 204 from a highly thermally resistant material such as, for example, an aramid fiber, commercially known as Kevlar®.

Figure 9:
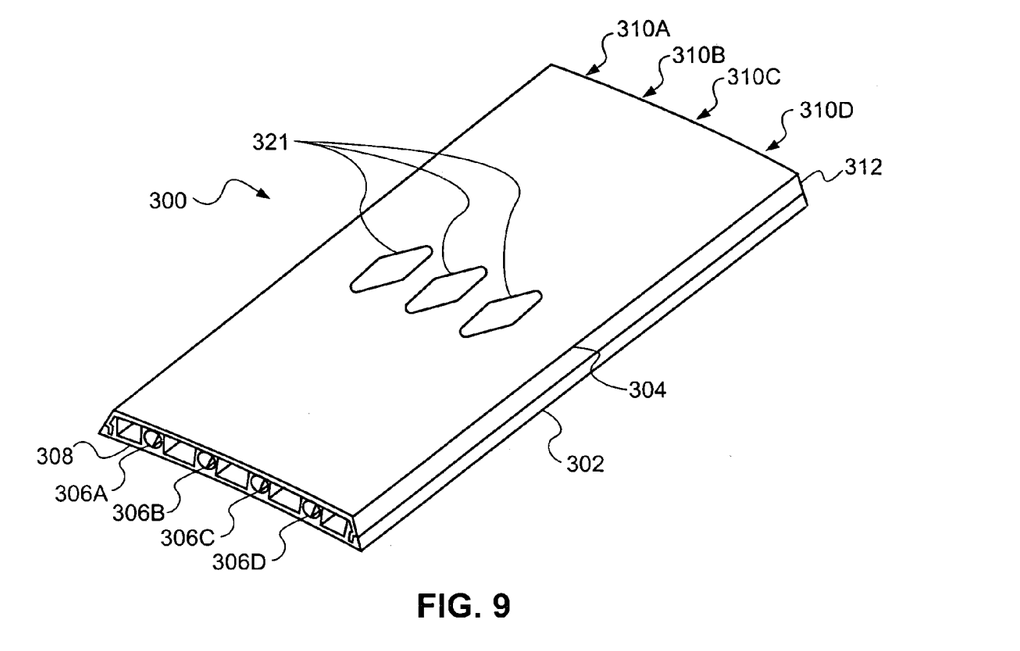
FIG. 9 is a perspective view of another embodiment of the strain control device of the present invention.

Referring now to FIG. 9, a strain control device 300 according to another embodiment is shown. The strain control device 300 includes a body 302 and a cover 304 cooperatively mated and interlocked with the body 302. A first plurality of openings 306A–306D or ports is formed along a first end 308 of the body 302 and a second plurality of openings 310A–310D is formed through the opposing end 312 of body 302.

Figure 10:
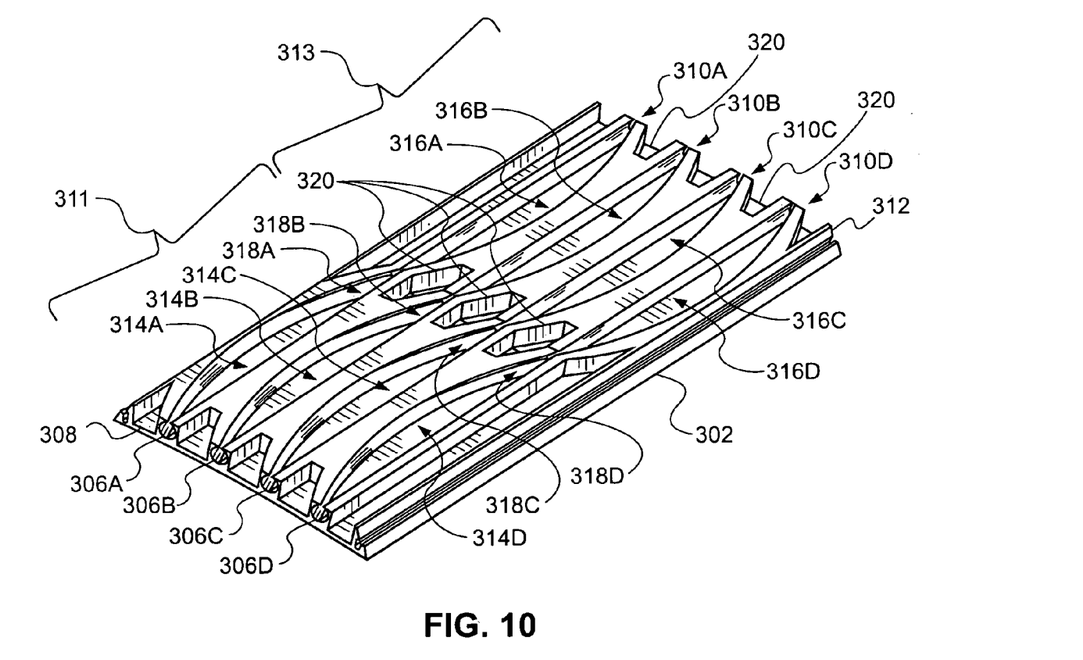
FIG. 10 is a perspective view of another embodiment of the strain control device of the present invention with its associated cover removed.

As seen in FIG. 10, which depicts the body 302 with the cover 304 removed therefrom, the first plurality of openings 306A–306D open up into an associated plurality of cavities 314A–314D formed in a first body section 311. Similarly, the second plurality of openings 310A–310D open to another plurality of cavities 316A–316D formed in a second body section 313. The first and second set of cavities 314A–314D and 316A–316D are adjoined by an additional set of openings 318A–318D, respectively.

The strain control device 300 is thus similar to the embodiment described above with respect to FIGS. 2 and 3 but allows for multiple transmission lines to be installed in a single strain control device 300. Additionally, the strain control device 300 includes a plurality of air passages 320 which both reduce the weight of the strain control device 300 and may be in communication with cavities 314A–314D and 316A–316D to serve as an interim air passage from the cavities 314 and 316 through the cover 304. One or more openings 321 may be placed within the cover 304 in communication with the air passages 320, thereby allowing air to flow from the cavities 314 and 316 without directly exposing a transmission line 250 contained therein to the external environment.

Additional voids or compartments may likewise be designed into the strain control device 300 to accommodate, for example, ordnance systems (such as destruct charges 104A–see FIG. 1) associated with rocket motors as will be understood by those of skill in the art.

As will be appreciated by those of ordinary skill in the art, the strain control devices disclosed herein may be arranged in various configurations as is required for specific installations and applications. For example, referring to the embodiment described with respect to FIGS. 8 and 9, multiple strain control devices 300 may be arranged in an end 312 to end 308 pattern such that a transmission line may be extended for a desired length along a structure. Additionally, if so desired, multiple strain control devices 300 may be layered in a laminated manner in order to accommodate a high volume of transmission lines.

Additionally, the thickness of the strain control devices 300 may be varied as may be desired. The variance of thickness may be desirable in designing for specific thermal conditions or, in the case of installation on a rocket motor or other aerospace vehicle, in designing the aerodynamics of the resulting structure. Further, with reference to the destruct charge 104A shown in FIG. 1, those of skill in the art will appreciate that it is necessary to maintain a minimum distance between the chevron of the shaped destruct charge and the casing of the booster rocket motor in order for the destruct charge 104A to be effective. Thus, by providing added thickness in the body 302 of the strain control device 300, such designs and configurations are more easily obtained.

Alternative embodiments may also include a body which includes a single cavity formed therein rather than a longitudinally extending pattern of multiple cavities. Thus, for example, referring briefly to FIG. 3, only the first cavity 214 may exist in the body. Again, this may add to the flexibility of installing transmission lines in varied applications and configurations. Alternatively, three or more cavities may be formed in a longitudinally arranged repeating pattern. In such a case, the repeating pattern may include a reversal of cavities about a longitudinally extending centerline from one cavity to the next adjacent cavity. Such flexibility obtained from the modular nature of the strain control devices allows for multiple bodies 202, 302 to be arranged in varying patterns. For example, bodies of varied length may be installed in an end-to-end pattern to achieve a desired length. Further, multiple transmission lines installed in the body 302 described with respect FIG. 10 may not all be of equal length. Thus, it may be desirable to arrange one or more bodies 202 described with respect to FIG. 3 in an end-to-end fashion with one or more bodies 302 of FIG. 10 so as to terminate some of the transmission lines at a given location while extending other transmission lines past the location.

Figure 11:
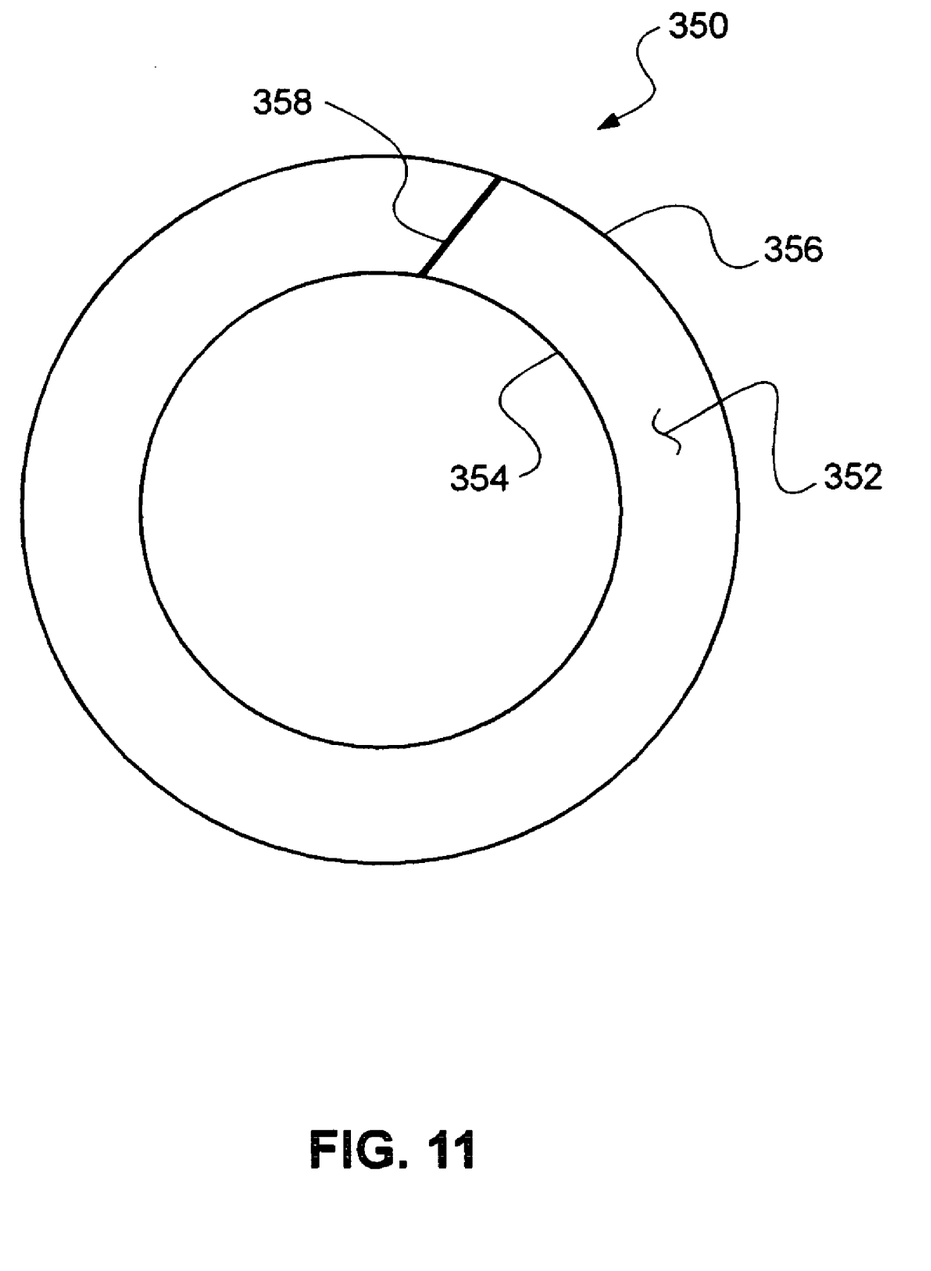
FIG. 11 shows an adapter which may be used in conjunction with various embodiments of the present invention.

Referring now to FIG. 11, an adapter 350 is shown which may be utilized in conjunction with the various embodiments of the present invention. The adapter 350 may be described as including a generally annular body 352 having an inner radius 354 and an outer radius 356. The adapter 350 may also include a cut portion 358 through the annular body 352 extending from the inner radius 354 to the outer radius 356. The cut portion 358 may be a simple cut as shown, or it may include the removal of a larger portion of the annular body 352 such that the annular body 352 is substantially C-shaped with a mouth portion (i.e., like the openings 206, 210 and 224 described above with respect to FIG. 3).

The adapter 350 is designed such that the inner radius 354 is sized and configured to fit around a transmission line of a particular size. The outer radius 356 of the adapter 350 is configured to fit within one of the openings 206, 210 and 224 (FIG. 3) of a strain control device. The adapter 350 may then function as the opening into which it is inserted but with a different internal diameter so as to frictionally or snugly grasp a transmission line of a smaller diameter positioned within a body 202, 302. The adapter 350 may be sized and configured so as to effect an interference or compression fit between the adapter 350 and the openings 206, 210, or 224 into which it is inserted. Thus, by using the adapter 350, a strain control device having openings 206, 210, and 224 exhibiting a particular size and configuration may accommodate transmission lines of numerous sizes and/or configurations.

For example, the body 302 described with respect to FIG. 10 may include multiple transmission lines, wherein each transmission line exhibits a different diameter. However, the use of adapters allows the openings 306A–306D, 310A–310D and 318A–318D to be formed of a single size and configuration if so desired. Likewise, the adapters may be utilized to accommodate transmission lines having a cross-section that is not substantially circular. For example, the shaped destruct charge 104A of FIG. 1 may be installed by using an adapter having an outer surface configured to cooperatively engage a C-shaped opening while the internal surface of the adapter 350 is configured to cooperatively engage with the shaped destruct charge 104A.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A method of controlling strain in a transmission line, the method comprising:
   providing a body;
   forming a first opening in a first end of the body;
   forming a second opening in a second end of the body;
   forming at least one cavity in a surface of the body disposed between the first and second openings;
   defining the at least one cavity with a peripheral boundary which includes a first wall and a second opposing wall which deviates from the first wall;
   positioning a transmission line within the at least one cavity such that it extends from the first opening, through the at least one cavity and through the second opening;
   subjecting the body to a strain inducing force in a first direction; and
   displacing at least a portion of the transmission line within the at least one cavity in a direction substantially transverse to the first direction.

2. The method according to claim 1, further comprising sizing and configuring the first and second openings to frictionally grasp the transmission line as it extends therethrough.

3. The method according to claim 2, wherein the positioning the transmission line within the at least one cavity includes positioning the at least a portion of the transmission line substantially midway between the first wall and the second opposing wall with the body being in an unstrained state such that is substantially free of contact with the first wall and the second wall.

4. The method according to claim 3, wherein displacing at least a portion of the transmission line within the at least one cavity in a direction substantially transverse to the first direction includes displacing the at least a portion of the transmission line towards the first wall.

5. The method according to claim 1, further comprising forming at least one grasping member in the body sized and configured for receipt of the transmission line at a location between the first opening and the second opening, and wherein forming at least one cavity in the body includes forming at least a first cavity between the first opening and the at least one grasping member and at least a second cavity between at least one grasping member and the second opening.

6. The method according to claim 5, wherein displacing at least a portion of the transmission line within the at least one cavity further comprises displacing a first portion of the transmission line within the at least a first cavity and displacing a second portion of the transmission line within the at least a second cavity.

7. The method according to claim 6, wherein the first portion of the transmission line is displaced in a second direction that is substantially transverse to the first direction and wherein the second portion is displaced in a third direction that is substantially opposite to the second direction.

8. A method of controlling strain in a transmission line, the method comprising:
   providing a body having a first grasping member and a second grasping member;
   forming at least one cavity in the body in communication with the first and second grasping members, the at least one cavity being configured to provide a deviation path to a transmission line disposed therein;
   frictionally engaging a first portion of the transmission line with the first grasping member;
   frictionally engaging a second portion of the transmission line with the second grasping member;
   disposing a third portion of the transmission line within the at least one cavity along a first defined path; and
   displacing the third portion of the transmission line from the first defined path along the deviation path within the at least one cavity.

9. The method according to claim 8, further comprising:
   providing the body with a third grasping member;
   forming at least a second cavity in the body in communication with the second grasping member and the third grasping member;
   frictionally engaging a fourth portion of the transmission line with the third grasping member;
   disposing a fifth portion of the transmission line within the at least a second cavity along a second defined path; and
   displacing the fifth portion of the transmission line from the second defined path within the at least a second cavity.

10. A method of forming a strain control device, the method comprising:
    providing a body;
    forming a first opening in a first end of the body, the first opening including a first grasping member configured to frictionally grasp a first portion of a transmission line disposed therethrough;
    forming a second opening in a second end of the body, the second opening including a second grasping member configured to frictionally grasp a second portion of a transmission line disposed therethrough; and
    forming at least one cavity in a surface of the body disposed between the first and second openings including defining the at least one cavity, at least in part, by a first wall that extends substantially continuously from the first opening to the second opening and a second opposing wall that extends substantially continuously from the first opening to the second opening.

11. The method according to claim 10, wherein the first wall includes a substantially linear wall and, wherein the second opposing wall deviates from the first substantially linear wall.

12. The method according to claim 11, wherein the providing a body, forming a first opening, forming a second opening and forming at least one cavity includes molding a body having a first and second opening and at least one cavity.

13. The method according to claim 11, wherein the providing a body includes forming the body of a material comprising nitrile rubber.

14. The method according to claim 11, wherein the providing a body includes forming the body of a material comprising neoprene.

15. The method according to claim 11, wherein the providing a body includes providing a body formed of a thermally insulative material.

16. The method according to claim 10, further comprising defining an axis from the first opening to the second opening and forming the first wall to deviate from the axis in a first direction and forming the second wall to deviate from the axis in a second direction, different from the first direction.

17. The method according to claim 16, further comprising each of the first wall and the second wall to exhibit substantially arcuate geometries.

18. The method according to claim 10, further comprising forming at least one grasping member in the body sized and configured for receipt of a transmission line at a location between the first opening and the second opening, and wherein forming at least one cavity in the body includes forming at least a first cavity between the first opening and the at least one grasping member and at least a second cavity between at least one grasping member and the second opening.

19. The method according to claim 10, further comprising:
   forming a third opening in a first end of the body;
   forming a fourth opening in a second end of the body; and
   forming at least one other cavity in a surface of the body disposed between the third and fourth openings.

20. The method according to claim 19, further comprising defining the at least one other cavity, at least in part, by a third wall that extends substantially continuously from the third opening to the fourth opening and a fourth opposing wall that extends substantially continuously from the third opening to the fourth opening.

* * * * *

UNITED STATES PATENT AND TRADEMARK OFFICE
CERTIFICATE OF CORRECTION

| | | |
|---|---|---|
| PATENT NO. | : 6,959,491 B2 | Page 1 of 1 |
| APPLICATION NO. | : 10/871149 | |
| DATED | : November 1, 2005 | |
| INVENTOR(S) | : Thomas W. Higgs | |

It is certified that error appears in the above-identified patent and that said Letters Patent is hereby corrected as shown below:

In the specification:
  COLUMN 7,   LINE 54,    change "$S=2RA$ and    EQ. 2:" to
                                              --EQ. 2:       $S=2RA$--

In the claims:
CLAIM 12,   COLUMN 12,  LINES 57-58   change "wherein the providing a body" to --wherein providing a body--

Signed and Sealed this

Twenty-fourth Day of February, 2009

JOHN DOLL
*Acting Director of the United States Patent and Trademark Office*